Dec. 24, 1957     W. J. CALDWELL     2,817,283
METHOD AND STRUCTURE FOR CONTROLLING THERMAL EFFECTS
IN THE AIR CONDITIONING OF MULTI-STORIED BUILDINGS
Filed July 24, 1951
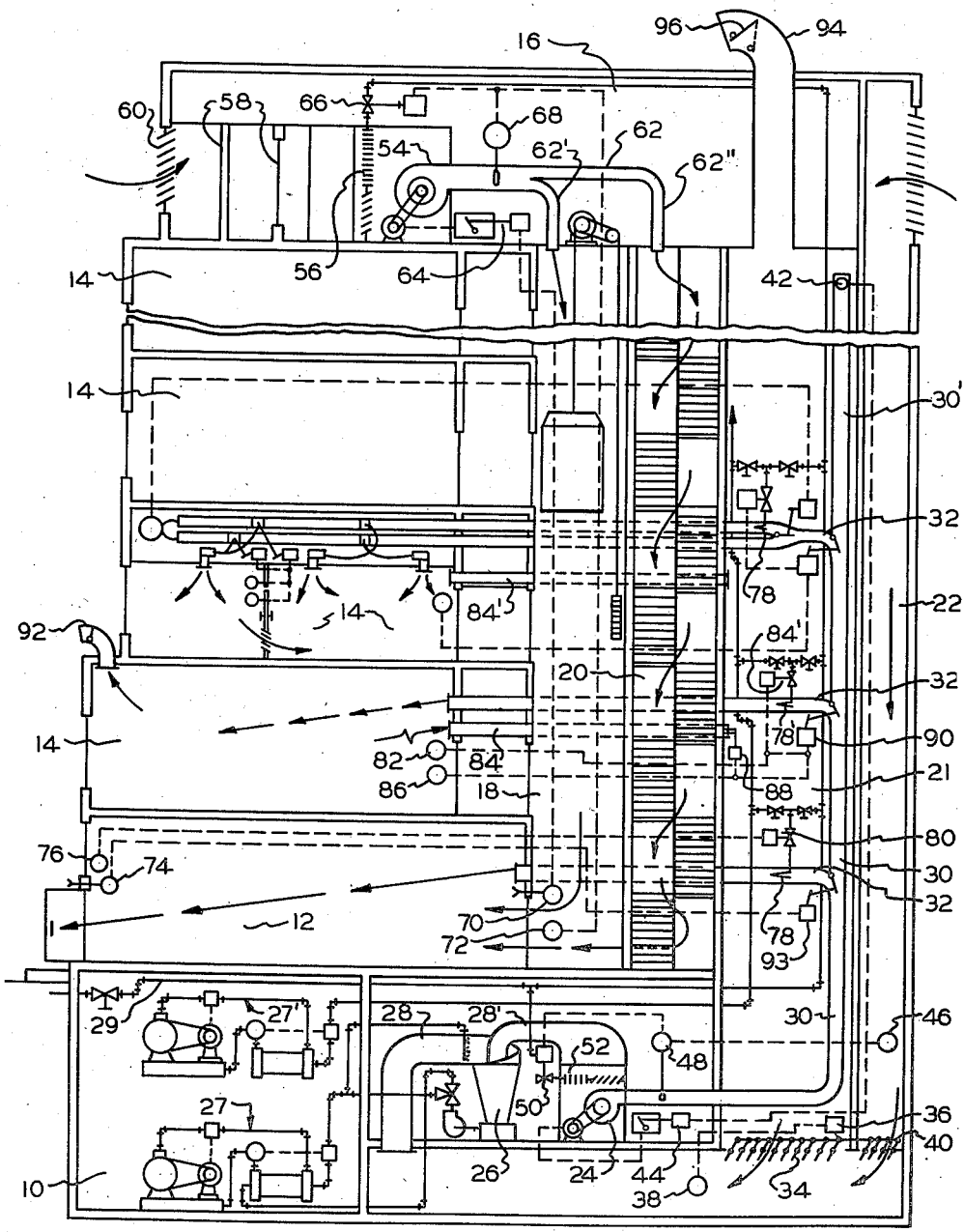
INVENTOR
WILLIAM J. CALDWELL
BY
ATTORNEY

United States Patent Office 2,817,283
Patented Dec. 24, 1957

2,817,283

METHOD AND STRUCTURE FOR CONTROLLING THERMAL EFFECTS IN THE AIR CONDITIONING OF MULTI-STORIED BUILDINGS

William J. Caldwell, Independence, Mo.

Application July 24, 1951, Serial No. 238,342

2 Claims. (Cl. 98—33)

This invention relates to the air conditioning of buildings by a pressurized air system as disclosed in co-pending application Serial Number 187,258, filed August 23, 1950, and in particular to the air conditioning, by such a system, of tall or multi-story buildings having lift shafts and stairways, which give rise to a chimney effect.

It is an important object of this invention to provide a system for air conditioning tall and multi-story buildings using pressurized air, in which the chimney effect due to lift shafts, stairways and the opening of doors at entrances is satisfactorily overcome by utilization of the pressurized air.

It is a further object of the invention to provide an air pressurized conditioning system for tall and multi-storied buildings in which the upper portion of the building is pressurized sufficiently to offset chimney effect so as thereby to counteract the forces tending to cause powerful air infiltration at entrances and window openings at the lower portion of the building.

Still further objects of the invention are to provide a pressurized air conditioning system with which the internal building pressures can be automatically controlled and with which the air pressurization of individual floor levels of a multi-storied building can be brought under independent control in a common air pressurizing system serving the different floor levels.

The above and further objects and advantages of the invention, residing in the construction, arrangement and combination of parts will appear clear from a consideration of the following description with reference to the accompanying drawing.

The drawing is schematic in character and shows the invention applied to the conditioning of a multi-storied building, certain of the floors of which have been broken away in the drawing to facilitate illustration.

Referring to the drawing, a building structure is shown comprising a basement 10, first floor lobby 12, upper floors 14, elevator pent-house 16, elevator shaft 18, stairway shaft 20, and an outside duct system 21, 22 extending vertically from the basement to the said pent-house.

Installed in the basement 10 there is an air pressurizing system comprising the combination of a pressure blower 24, and centrifugal air washer-conditioner 26 connected by a duct system 28, 28' and linked to the primary and secondary refrigeration plants 27, 27' respectively and the steam supply line 29, as indicated.

The blower 24 delivers the conditioned air in a highly pressurized condition to the duct 30 which has a vertical extension 30' in the duct 21 with horizontal branches 32 to the individual floors 12 and 14, the first of which floors 14 may be a ballroom.

The duct 21 has a return air damper system 34 at its lower end controlled by a motor 36, with associated thermostat 38, while the duct 22 has a fresh air damper system 40 at its lower end.

At its upper end, the pressurized air supply duct 30' has an associated pressure switch 42, connected in circuit with a motor 44 in the basement, controlling the speed of the blower 24.

46 indicates a master thermostat, connected through a low-limit thermostat 48 with a valve 50 controlling the supply of steam (or hot water) to the main heating coil 52.

For the purpose of counteracting the chimney effect involved in this building structure, another air pressurizing system is installed in the elevator pent-house 16 and connected for pressurizing the upper building portion. This additional pressurizing system is shown as comprising the pressure blower 54, employed in association with heating coils 56, filters 58, fresh air inlet 60, duct system 62 having depending branches 62', 62'' to the elevator shaft 18 and stairway 20, respectively, damper motor control 64 controlling the speed of the blower 54, motorized valve 66 controlling the operation of the heating coil 56, by low-limit thermostat 68.

As shown in the drawing the damper motor control 64 is connected in circuit with a sensitive pressure switch 70 in the base of the elevator shaft 18, this switch being capable of reacting to the difference in pressure between the base of the shaft and the lower floor of the building. The motorized control valve 66 in the elevator penthouse is also shown in circuit with a thermostat 72 at the base of the elevator shaft.

Located in the entrance to the lobby 12 there is a pressure switch 74 and a thermostat 76, this thermostat being connected to control the heat supplied to the lobby pressurizing duct 32 by a booster coil assembly 78.

Chimney effects in tall buildings are most pronounced in elevator shafts, stairwells and pipe shafts, since these simulate vertical flues. From these points reactions due to chimney effects lead off to each floor, as when stairwell doors are opened or elevators stop at a floor. We counteract this by drawing outside air through the heating coils 56 and pumping this air, pressurized by the blower 54, into the top of the shafts 18 and 20 via the ducts 62, 62' and 62''.

Since chimney effect is most pronounced at the ground floor, the control of the pent-house blower 54 producing the pressurized counterflow should be at this point. We, therefore, place the sensitive pressure switch 70 in the base of the elevator shaft, where it is able to react to the difference in pressure between the base of the shaft and the lower floor of the building. This pressure switch, being connected to the damper motor 64, controls the speed of the blower and thus pressurizes the shaft 18 until the pressure at the bottom thereof is identical to that at the first floor of the building.

The heating coil 56 in the intake to the blower 54 serves to raise the outdoor air to building temperature before delivery into the shafts 18 and 20. Automatic operation of the coil 56 is effected by the motorized valve 66 controlled by the low-limit thermostat 68 in series with the main control thermostat 72 in the base of the shaft 18. The low-limit thermostat 68 prevents the delivery of air from dropping below a desired temperature and the thermostat 72 establishes the upper temperature required to effect comfort conditions in the shafts. This is a conventional thermostat hook-up.

The technique for the entire building provides separate temperature control for each floor by means of booster coils in the duct 32 leading off from the main supply duct 30' into each floor, as identified on the intermediate typical floor in the drawing. According to this technique, the bulk of the heating requirements are provided at the main air supply blower (in this case indicated as one unit 24 in the basement of the building, but equally true if several main units are employed, such as in the basement, on a mid-floor and in pent-houses). About 80% of the heating requirements would be so furnished, with the remainder furnished by the booster coils at each floor. Since the amount of heat required in the building bears a direct relationship to outside temperature, the conventional practice of installing a master thermostat where it is subjected to outside temperature serves to increase the degree to which the temperature of the air supply to the building is raised to meet the heat losses inflicted by a given outdoor temperature. In the drawing this master thermostat 46 is shown located in the fresh air shaft 22 controlling the supply of steam (or hot water) to the main heating coil 52 through valve 50. The low limit thermostat 48 prevents air being delivered into the building at too low a temperature.

As indicated in the drawing, each floor may draw off a varying quantity of air from the main air supply riser 30'. This means that the blower 24 must deliver a varying quantity of air. Our technique for automatically varying the air volume supplied by the main supply riser 30' is to connect the pressure switch 42 to the upper end of the duct run 30' and to so connect this control to the speed regulator of the main blower 24 through damper motor 44 that the speed of the blower is varied as required to maintain a predetermined pressure in the supply duct at all times.

Where the first floor of a tall building has extensive entrance facilities, we consider it desirable to eliminate return air facilities in order to insure against infiltration. In the drawing we show the method for handling the entrance of a tall building, and eliminating the need for vestibules or revolving doors. The pressure switch 74 reacts to the difference in pressure between the lobby 12 and outside to control the amount of air fed to the first floor by regulating the volume of air withdrawn from the supply duct 30 through the damper and motor control 93. Thus not only the volume of air but the resulting velocity of the beam of air directed at the entrance is increased until pressure switch 74 is satisfied. No return air port is provided, so that air supplied into the lobby 12 can only escape through the entrance, or up the building shafts; but since pressure switch 70 prevents flow into the shafts as described hereinbefore, air must seek escape through the entrances. The temperature of the lobby is controlled by the thermostat 76 controlling the heat supplied through the booster coil 78 through supply valve 80.

It is possible to effect this type of control by using a thermostat near the entrance to increase the amount of air supplied into the lobby until this thermostat is satisfied (and it can be satisfied only by being subjected to warm air supply, not outside air) and secondarily controlling the temperature of air delivered into the lobby by a thermostat in the supply air stream set at desired lobby temperature or as many degrees above that point as will serve remaining incidental heat losses.

We indicate a typical ballroom or auditorium on the second floor for the purpose of introducing a booster system into the building system. Under normal conditions theremostat 82, located near or in the return air duct 84 so as to reflect room temperature controls the amount of heat furnished by controlling the supply valve 84' to the booster coil 78'.

When booster switch 86 is actuated it closes the return air damper from the room through motor 88 and changes the operating range of motor 90 so as to increase the supply of air to the ballroom. The booster coil valve 84' and the motor 90 remain at all times under the control of the room thermostat 82. With the return air passage 84 blocked, air from the room must escape through pressure vents 92 in the roof; a desirable feature for rooms used for large gatherings since the room air is generally polluted from smoke or ventilation usage.

The amount of outside and return air furnished to the main supply blower 24 is controlled by the dampers 40 and 34, respectively, linked in opposition; that is, one opens when the other closes, and automatically operated through the damper motor 36. The fresh air dampers are adjusted so that even at its end position the damper motor 36 cannot completely close them. This adjustment insures an initial pressurizing effect in the building as well as insuring an adequate supply of fresh air for the building's ventilation requirements as dictated by occupancy. The mixed air thermostat 38 automatically adjusts the amount of fresh air admitted to the mixed air system. Since the return air is always of nearly constant temperature, as determined by that maintained throughout the building, it follows that the colder the fresh air becomes, the less of it is admitted in order for the mixed air thermostat 38 to be satisfied.

This is an advantage in mild weather as it allows the use of outside air for moderate cooling when refrigeration would otherwise be required. However, if nearly 100% outside air is admitted, the building might readily be over-pressurized. With the return air dampers 34 closed, or nearly closed, air returning into the return air shaft from each floor would not have any means of escape. For this purpose we show a pressure vent 94 to outside at the top of the return air shaft 21, the vent including a weighted damper 96 which will not open until the pressure exerted against it is sufficient to swing it open.

The centrifugal washer conditioner 26 and refrigeration plants seen in the drawing adapt the system for summer conditioning. This may introduce the use of the booster coils at the various floor levels to modify the amount of cooling air supplied to a given floor and the employment of a two temperature duct system (as disclosed in application Serial No. 187,258) on typical floors, together with modification of the cooling effect on the first and second floors.

Alternatively, the centrifugal washer conditioner 26 could be employed to supply only the major portion of the cooling capacity required and the booster coils employed to supply the additional cooling needed for each floor. This could be accomplished by circulating chilled water to the booster coil of each floor and by providing valve connections in the supply system to enable chilled water to flow through the booster coils 78, 78' instead of hot water, or steam. In this way each floor could obtain the balance of the cooling requirements from the cooling booster coils.

The entire system permits of its use to effect three seasonal controls. Winter, in which the system can be set to use steam or hot water for the booster coils, as well as the main heating coils 52 and 56. Mild weather, in which no steam or hot water would be supplied to the main heating coils, chilled air would flow through the riser 30' and steam or hot air supplied to the booster coils, and summer, in which chilled water would also be supplied to the booster coils. This three seasonal control could be arranged to be effected by the use of relays operated by thermostats set to react to the outdoor temperatures and weather conditions.

What is claimed is:

1. In the air conditioning of buildings having multiple floors interconnected by elevator and stairway shafts the provision of air conditioning pressurizing means connected to supply the pressurized air to the individual floors to provide a high degree of diffusion principally by kinetic energy of the discharged air being transferred into tthe ambient air of these floor spaces, combined with means for simultaneously pressurizing the said shafts in opposition to the chimney or updraft effect therein, and control means for said last means located at the point of maximum chimney effect in said shafts to maintain the pressure at said point substantially equal to the pressure of the adjacent floor space.

2. In an air conditioning system, the combination with a building structure having multiple floors interconnected by stair and elevator shafts, of air pressurizing means in the lower floor, an up-rising duct system connecting said pressurizing means with the individual floor spaces, air pressurizing means in the upper floor, the duct means connecting said second mentioned pressurizing means to the upper ends of said shafts to pressurize said shafts in opposition to chimney effect or updraft therein.

References Cited in the file of this patent

UNITED STATES PATENTS

| | | |
|---|---|---|
| 1,520,231 | Fleisher | Dec. 23, 1924 |
| 1,983,023 | Fleisher | Dec. 4, 1934 |
| 1,985,050 | Merle | Dec. 18, 1934 |
| 2,262,243 | Lord | Nov. 11, 1941 |
| 2,282,210 | Plum | May 5, 1942 |